United States Patent [19]

Ruffell

[11] 4,307,406
[45] Dec. 22, 1981

[54] MULTISTYLI RECORDING SYSTEMS

[75] Inventor: John P. Ruffell, Auckland, New Zealand

[73] Assignee: Bell & Howell Company, Chicago, Ill.

[21] Appl. No.: 964,545

[22] Filed: Nov. 29, 1978

[30] Foreign Application Priority Data

May 5, 1978 [NZ] New Zealand .................. 187187

[51] Int. Cl.² .................. G01D 9/28; G01D 15/16
[52] U.S. Cl. .................. 346/49; 346/139 R
[58] Field of Search .................. 346/1, 49, 139 R; 400/352, 353

[56] References Cited

U.S. PATENT DOCUMENTS

| 3,369,250 | 2/1968 | Gifft | 346/139 R X |
| 3,641,583 | 2/1972 | Cless et al. | 346/139 R X |
| 3,644,931 | 2/1972 | Stringer et al. | 346/139 R X |
| 3,781,904 | 12/1973 | Firnig et al. | 346/139 R UX |
| 3,821,747 | 6/1974 | Mason | 346/139 R X |

FOREIGN PATENT DOCUMENTS 1506038 4/1978 United Kingdom .

Primary Examiner—George H. Miller, Jr.
Attorney, Agent, or Firm—Benoit Law Corporation

[57] ABSTRACT

Methods and apparatus for recording information with a reciprocating stylus assembly provide a mass which preferably corresponds to the mass of the stylus assembly. The stylus assembly and the provided mass are jointly reciprocated in phase opposition to each other, whereby stylus assembly vibrations are practically eliminated and the recording system is dynamically balanced.

28 Claims, 3 Drawing Figures

MULTISTYLI RECORDING SYSTEMS

BACKGROUND OF THE INVENTION

1. Field of the Invention

The subject invention relates to information recording and, more specifically, to multistyli recording systems, printer-plotters and apparatus capable of printing gray tone graphical and picture information as well as line graphics and alphanumerical characters. The invention also relates to digital facsimile receivers.

2. Prior-Art Statement

Reciprocating facsimile apparatus have been known for a long time, as may, for instance, be seen from U.S. Pat. No. 2,311,803, by R. J. Wise et al, employing a flying pen or stylus. Some systems have attempted to dispense with the need for a stylus drive by arranging a series of stationary styli across the recording medium or paper, as may, for instance, be seen in U.S. Pat. No. 2,937,064, by D. A. Walsh. In practice, stationary recording styli impose a severe limit to attainable resolution.

Some prior-art proposals have attempted to overcome such and other drawbacks by providing moving styli or stylus assemblies with the aid of endless bands, as may, for instance, be seen in U.S. Pat. No. 3,166,752, by H. C. Waterman, U.S. Pat. No. 3,369,250, by T. H. Gifft and French Pat. No. 1.349.168, by A. Hermet. In an effort to overcome design and performance limitations of such endless belt systems, a multistyli system of the type shown, for instance, in British Pat. No. 943,011 has been developed. In particular, this British patent discloses an electrically controlled character printer which prints using a plurality of styli, each stylus printing one character in a line of characters. The styli are oscillated by an amplitude equal to the stylus spacing and equal to the width of characters to be printed. At the same time the record sheet is continuously moved in a direction at right angles to the line of styli so that each character is built up over a plurality of stylus oscillations with the styli being activated at proper points within the oscillation cycle to produce a character formed by a number of print dots resulting from the stylus striking an ink ribbon disposed between the styli and the record sheet or formed by such other known ways as Xerography. As a matter of interest, recording systems in which the lateral deflections of styli are limited to interstylus spacing are disclosed in German Pat. No. 936,582, by J. Dreyfus-Graf.

U.S. Pat. No. 3,644,931, assigned to the subject assignee and herewith incorporated by reference herein, discloses a multi-styli recorder where the styli are again oscillated transverse to the record sheet motion to effect marking by electric discharges through an electro-sensitive record sheet. Each stylus prints within an assigned band as the record sheet is continuously advanced. The multichannel recorder disclosed produces a record with information displayed as a print intensity modulation which may vary down each band and between bands.

Variation in print intensity is achieved by varying the styli discharge pulse rate so that high print intensities are achieved with a high pulse rate and thus pulse density. The pulse rate of each stylus is varied in accordance with the usually analogue signal applied to each of the recorder channels.

Patterson, Ruffell, Walker and Schwartz in "A Digital Input Picture Printer System", a paper presented at the National Electronics and Geophysics Convention at the University of Auckland, August 1974, have described a printer capable of printing alpha-numerica characters and gray tone graphics and pictures which was developed from the multistyli recorder of the latter U.S. Pat. No. 3,644,931. The printer disclosed by Patterson et al prints each line of information as a series of dots, the size-intensity of which are determined by the styli writing pulse length and each line is printed while the styli are oscillated in a left to right direction with an amplitude equal to the styli spacing. The styli printing information is accepted and stored for the subsequent line as the styli are oscillated in a right to left direction during which time the electro-sensitive record sheet is advanced by a predetermined line spacing distance.

With the latter type of equipment, a certain printing speed increase may be brought about by increasing the stylus reciprocation frequency. However, practically attainable speed increases are limited by such factors as vibration and mechanical load on the stylus drive due to the mass of the stylus head and reciprocation assembly. Such factors increase as the square of the stylus reciprocation frequency, imposing thereby a natural limit that can only be overcome by a radically new approach.

SUMMARY OF THE INVENTION

It is a general object of this invention to overcome the above mentioned disadvantages.

It is a related object of this invention to provide improved stylus-type recording systems.

It is a germane object of this invention to increase attainable recording speed in stylus-type recording systems.

It is also an object of this invention to reduce stylus assembly vibrations in multistyli recording systems.

It is also an object of this invention to provide improved methods and apparatus for recording information with a plurality of recording styli distributed across, and reciprocated transversely of, a recording area.

It is also an object of this invention to provide multistyli recording systems and gray tone line printerplotters capable of printing high quality, high resolution gray tone pictures, line graphics and alpha-numerics at high writing speeds not achieved by prior-art equipment.

Other objects will become apparent in the further course of this disclosure.

From one aspect thereof, the subject invention resides in a method of recording information with a stylus assembly in a recording area, and resides more specifically in the improvement comprising in combination the steps of providing a mass, forming an eccentric in two halves and minimizing any force couple between said two halves by arranging said two halves immediately adjacent to each other, reciprocating the stylus assembly relative to the recording area with the aid of one of said two halves, reciprocating said mass in phase opposition to the reciprocating stylus assembly with the aid of the other of said two halves, and dynamically balancing the reciprocating stylus assembly with the reciprocating mass.

From another aspect thereof, the subject invention resides in a method of recording information with a stylus assembly in a recording area, and resides more specifically in the improvement comprising in combination the steps of providing a counterweight of a mass corresponding to the mass of the stylus assembly, forming an eccentric in two halves and minimizing any force couple between said two halves by arranging said two halves immediately adjacent to each other, reciprocating the stylus assembly relative to the recording area with the aid of one of said two halves, reciprocating the counterweight in phase opposition to the reciprocating stylus assembly with the aid of the other of said two halves, and dynamically balancing the reciprocating stylus assembly with the reciprocating counterweight.

From another aspect thereof, the subject invention resides in a method of recording information with a stylus assembly, and resides more specifically in the improvement comprising in combination the steps of providing a mass, forming an eccentric in two halves and minimizing any force couple between said two halves by arranging said two halves immediately adjacent to each other, coupling one of said two halves to the stylus assembly and coupling the other of said two halves to said mass, and jointly reciprocating the stylus assembly and said mass in phase opposition to each other by rotating said eccentric.

From another aspect thereof, the subject invention resides in a method of recording information with a stylus assembly, and resides more specifically in the improvement comprising in combination the steps of forming an eccentric in two halves and minimizing any force couple between said two halves by arranging said two halves immediately adjacent to each other, providing a counterweight of a mass corresponding to the mass of the stylus assembly, coupling one of said two halves to the stylus assembly and coupling the other of said two halves to the counterweight, and jointly reciprocating with said eccentric the stylus assembly and the counterweight in phase opposition to each other.

From another aspect thereof, the subject invention resides in apparatus for recording information with a stylus assembly in a recording area, and resides more specifically in the improvement comprising, in combination, first means for reciprocating the stylus assembly relative to the recording area including an eccentric composed of two immediately adjacent halves and means for coupling one of said halves to the stylus assembly, and means for dynamically balancing the reciprocating stylus assembly including a counterweight and means coupled to the other of side two halfs for reciprocating the counterweight in phase opposition to the reciprocating stylus assembly.

From another aspect thereof, the subject invention resides in apparatus for recording information with a stylus assembly, and resides more specifically in the improvement comprising, in combination, a counterweight, an eccentric composed of two immediately adjacent halves, for jointly reciprocating the stylus assembly and the counterweight in phase opposition to each other, including means for coupling, one of said halves to said stylus assembly, means for coupling the other of said halves to said counterweight, and means for rotating said eccentric.

From another aspect thereof, the subject invention resides in apparatus for recording information with a stylus assembly in a recording area, and resides more specifically in the improvement comprising, in combination, an eccentric comprising two immediately adjacent halves one of which is coupled to the stylus assembly for reciprocating the stylus assembly relative to the recording area, and means for dynamically balancing the reciprocating stylus assembly including a counterweight and means for coupling said two halves to each other, at an extreme angular displacement relative to each other, and means for coupling the other of said two halves to the counterweight for reciprocating the counterweight in phase opposition to the reciprocating stylus assembly.

From another aspect thereof, the subject invention resides in apparatus for recording information with a stylus assembly in a recording area, and resides more specifically in the improvement comprising, in combination, a shaft, means for rotating said shaft, an eccentric composed of two immediately adjacent halves located on said shaft, with one of said halves coupled to the stylus assembly for reciprocating the stylus assembly relative to the recording area during rotation of the shaft, and means for dynamically balancing the reciprocating stylus assembly including a counterweight and means for coupling said two halves to each other at an extreme angular displacement relative to each other, and means for coupling the other of said two halves to the counterweight for reciprocating the counterweight in phase opposition to the reciprocating stylus assembly during rotation of the shaft.

BRIEF DESCRIPTION OF THE DRAWINGS

The subject invention and its objects and aspects will become more readily apparent from the following detailed description of preferred embodiments thereof, illustrated by way of example in the accompanying drawings, in which.

DESCRIPTION OF PREFERRED EMBODIMENTS

Figure 1:
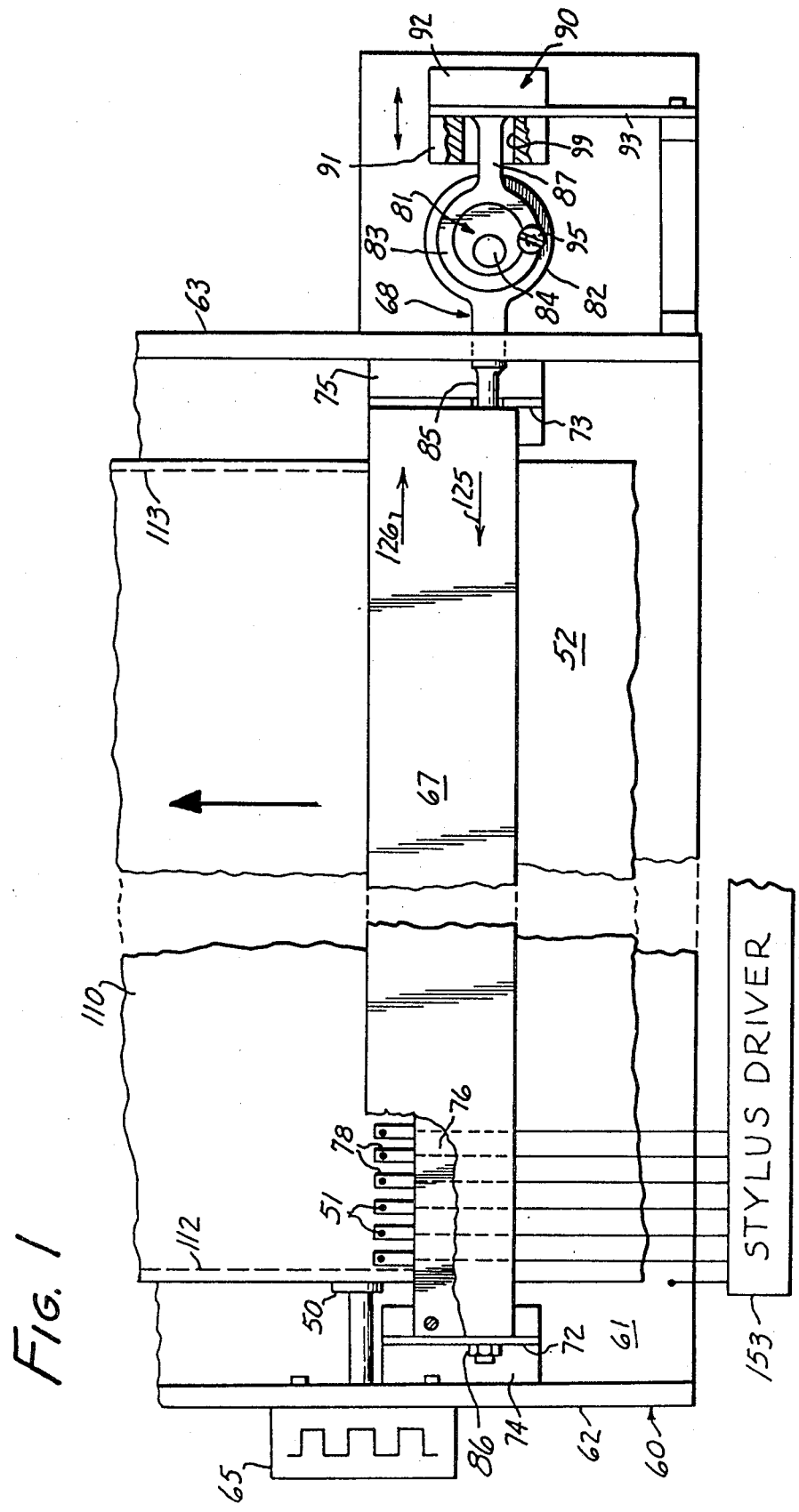
FIG. 1 is a top view of a multistyli recording apparatus having a dynamic balancing feature according to a preferred embodiment of the subject invention, with non-essential or conventional parts omitted for increased clarity.

By way of background and example, the illustrated multistyli recorder or printer 60 has a main frame assembly 61, including metal plate side walls 62 and 63. A recording paper 52 passes over or around a grounded platen at a series of recording styli 51 distributed across a recording area 110 located on the recording paper between dotted lines 112 and 113.

The styli 51 may be of a mechanical, optical, magnetic, electrical or other type for recording information in the recording area 110. By way of example, an electronic stylus driver 53 selectively energizes the styli 51 to cause them to record information in the recording area 110 on electrosensitive paper 52.

The platen 50 may be part of the drive of the recording paper 52 which may also include supply and takeup rollers, pinch rollers and other paper drive equipment, which may be conventional and a showing of which has been omitted for the purpose of increased clarity.

For instance, the paper transport mechanism may include a metal plate deck (not shown) which stretches across most of the main frame between side walls 62 and 63 to support the recording paper 52 adjacent the platen 50 which drives the paper.

In practice, printing with the styli 51 typically occurs along a line extending on the surface of the paper 52 along, and parallel to the axis of rotation of, the platen 50; the styli being reciprocated transversely to the recording area 110 for this purpose.

An electric stepping motor 65 is coupled to the platen 50 via an internal reduction drive and effects paper advance pursuant to a preferred embodiment.

The motion or advance of the paper 52 preferably proceeds in discrete increments rather than continuously, with one incremental advance occurring between each adjacent pair of lines to be printed. The stepping motor 65 and associated drive may be designed to produce one paper advance increment of $\frac{1}{8}$ mm for each angular step of the motor. Since the paper typically will be required to be moved $\frac{1}{8}$ mm within, say, 4 milliseconds, without over-shoot or chatter, the motor must be carefully controlled. The motor winding control is preferably effected by a transistor switching system which uses unclamped constant current circuits, that is no feed back diodes, to enable more rapid switching.

Figure 2:
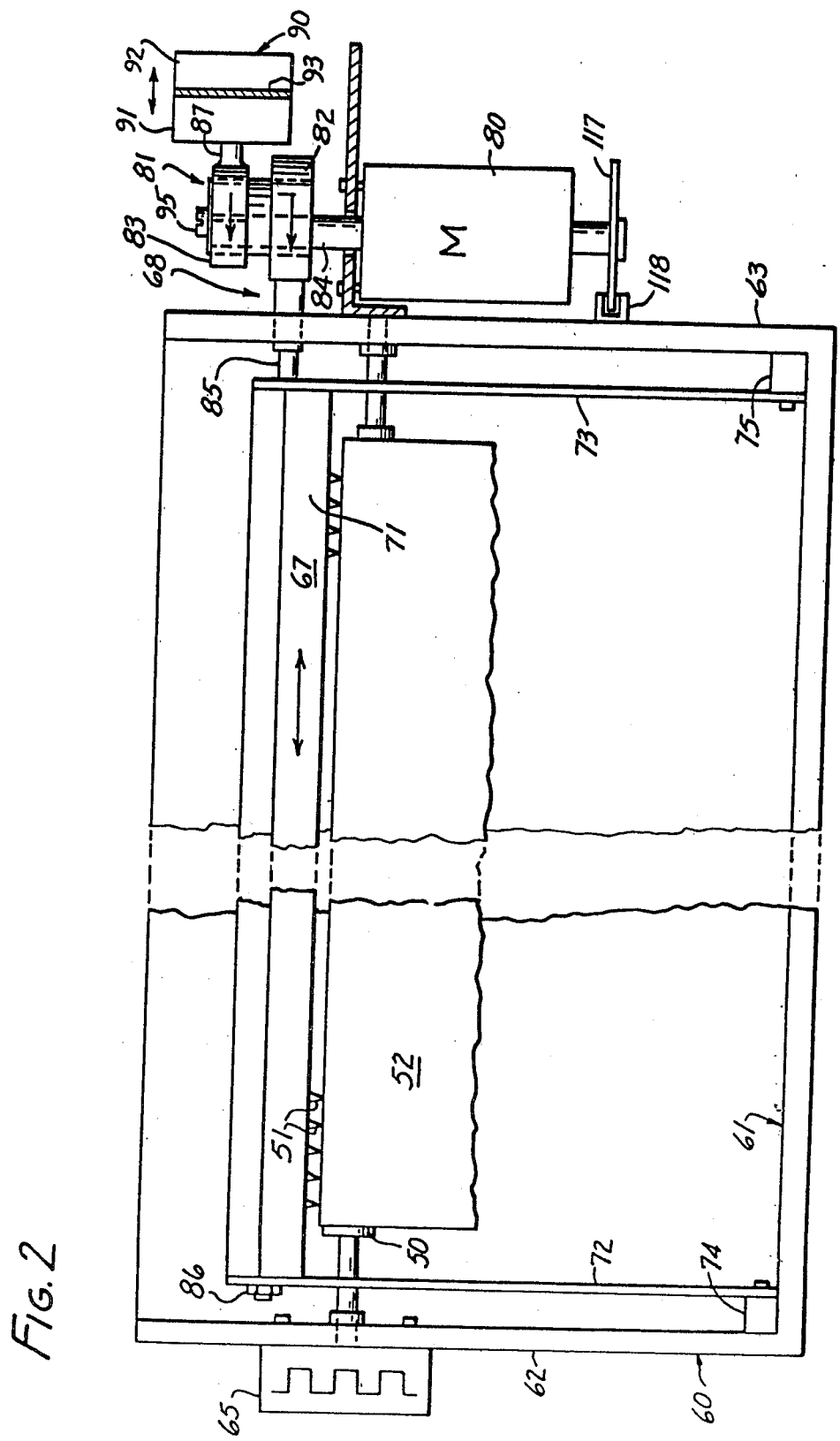
FIG. 2 is an elevation of the multistyli recording apparatus shown in FIG. 1.

FIGS. 1 and 2 also show the stylus head assembly 67 and stylus head wag drive 68. The stylus head assembly 67 comprises a head support 71 which is mounted on leaf springs 72 and 73 anchored to the main frame assembly by blocks 74 and 75, respectively, so that stylus head support is parallel to main frame 61 or main frame base plate. The leaf springs 72 and 73 may be provided with corresponding cutouts (not shown), if it is desired to locate the platen 50 more toward the styli or otherwise to accommodate the curvature of platen 50.

Leaf springs 72 and 73 form a spring suspension for the stylus assembly 67 which enables the stylus head support 71 to be oscillated parallel to the axis of the platen 50 and thus transverse to the longitudinal direction of the paper to be printed. Vertical motion is made negligible by making the leaf spring lengths much greater than the reciprocation amplitude. In place of leaf springs 72 and 73, it would be possible to use a slide arrangement to facilitate the oscillating or reciprocating motion of the head support; but the leaf spring mounting has been found superior for higher oscillation frequencies.

As seen in FIG. 1, the stylus head per se comprises a bar 76 which carries a number of leaf springs 78 which, in turn, carry the styli 51. The springs 78 with styli 51 are electrically insulated from each other and may be grouped into stylus modules which in a preferred prototype contain 16 styli per module. By way of example, each stylus consists of a tungsten tip mounted in the end of a leaf spring 78 cantilevered from the mounting bar 76 or module base. In use, the tungsten tips are held in continuous contact with the paper by the stored force in leaf springs 78. The styli diameter is preferably about 0.15 mm and the length of the cantilevered leaf spring 78 is a compromise between torsional stability which is degraded with length, and predictable stylus pressure which is enhanced with increasing length.

The stylus head is mounted in the support 67 with fastenings passing preferably through head apertures into threaded bores (not shown) provided in the head support.

To permit high oscillation frequencies, the stylus head assembly is made as light as possible and for this reason, no provision is made in the preferred embodiment to hinge the styli away from the paper and paper transport mechanism. Separation of the two may be performed by sliding the paper transport mechanism rearwardly on lateral slides (not shown).

In the predecessor multistyli printer described in the above mentioned Patterson et al paper, the stylus assembly was very massive as compared to the stylus assembly 67 and, at the writing speed of that printer, provided tolerable overall vibration. On the other hand, a combination of higher transverse scan styli speed and much lower machine or stylus assembly mass brought about unacceptable vibration in experimental predecessors of the illustrated printer. This problem has been solved by the dynamic balancing methods and devices of the subject invention.

In particular, the stylus assembly 67 is oscillated by a servo-controlled DC motor 80. According to the illustrated preferred embodiment of the subject invention, the output shaft 84 of the servo motor 80 carries a double eccentric 81. The eccentric is formed in two halves 82 and 83, with the eccentric half 82 being coupled to a stylus head connecting rod 85 which passes through apertures in the stylus head support 71 and is connected thereto by fasteners, one of which is seen at 86.

Rotation of the eccentric 81 by the DC motor 80 thus causes the stylus head assembly 67 to execute a reciprocating motion on leaf springs 72 and 73, which in the preferred form is simple harmonic. Equivalent other reciprocating drives could be employed and inevitable regions of changing velocity confined to the regions outside the assigned printing hands.

To overcome the above mentioned vibration of the printer caused by the oscillating or reciprocating stylus assembly 67 and its associated parts, a counterweight 90 may be oscillated or reciprocated in counter movement or phase opposition to the oscillation or reciprocation of the stylus assembly 67. As readily seen in FIGS. 1 and 2, the mass of the counterweight 90 is connected relative to the mass of the elongate stylus assembly 67.

According to the preferred embodiment of the subject invention shown in FIGS. 1 and 2, the counterweight 90 is made up of two weights or masses 91 and 92 clamped to a leaf spring 93 and coupled to the upper eccentric half 83 by a rod 87. Adjustment of lower eccentric half 82 relative to the motor shaft axis determines the stylus head oscillation amplitude and relative angular orientation of the two eccentric halves permits vibration cancellation. A set screw 95 is shown in FIGS. 1 and 2 as a means for releasably retaining the eccenter parts in a set relative position.

According to the subject invention, the mass or counterweight 90 is reciprocated in phase opposition to the reciprocating stylus assembly 67, which is dynamically balanced with the reciprocating mass or counterweight 90.

According to a preferred embodiment of the subject invention, the counterweight 90 is provided with a mass corresponding to the mass of the stylus assembly 67. In particular, the mass of the counterweight 90 may be equal to the mass of the stylus assembly.

As shown at 72 and 73 for the stylus assembly, and at 93 for the counterweight or mass 90, the stylus assembly 67 and the counterweight or mass 90 may each be spring suspended. In particular, the leaf spring suspension technique used to support the stylus assembly 67 is in effect employed to suspend the counterweight 90 for oscillatory motion.

According to the subject invention, the double eccentric 81 jointly reciprocates the stylus assembly 67 and the counterweight or mass 90 in phase opposition to each other.

Figure 3:
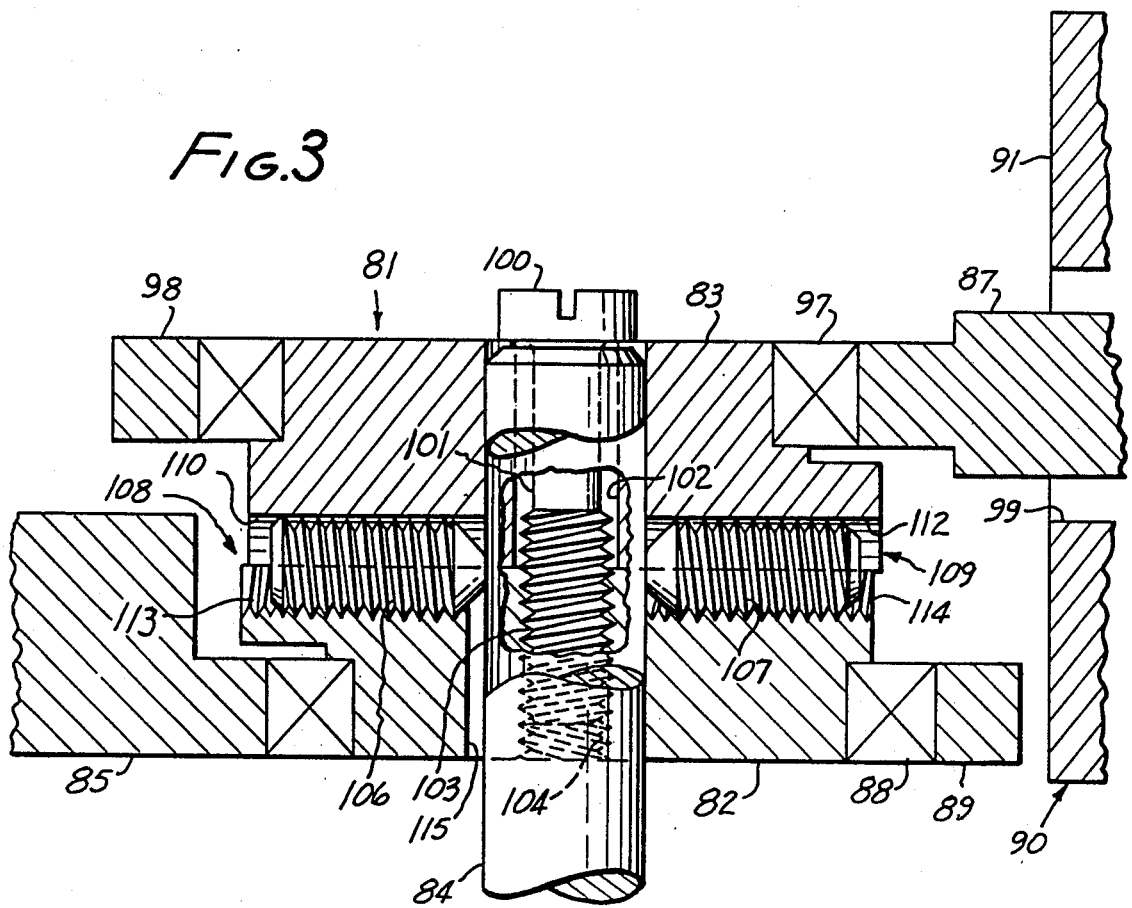
FIG. 3 is a section through an eccentric drive assembly according to a further preferred embodiment of the subject invention.

The double eccentric 81 shown in section in FIG. 3 has been found that effective in practice, that multistyli printers have been retrofitted therewith to reduce vibration, increase writing speed and enhance printout quality.

In particular, one half of the eccentric, herein sometimes called "first eccentric drive" 82 is located on the shaft 84 which is rotated by the servo motor 80. The first eccentric drive 82 is coupled to the stylus assembly 67 via a bearing 88, flange 89 and connecting rod 85 for reciprocating the stylus assembly 67 relative to the recording area 110 or paper 52 during rotation of the shaft 84.

In addition to the counterweight or mass 90, the means according to the illustrated preferred embodiment for dynamically balancing the reciprocating stylus assembly 67 includes the second half of the eccentric, herein sometimes called "second eccentric drive" 83, located on the shaft 84 and coupled to the first eccentric drive at an extreme angular displacement relative to the first eccentric drive. This extreme angular displacement may be a displacement by 180°. In other words, the phase angles of the first and second eccentric drives 82 a 83 may be diametrically opposed so that the oscillations or reciprocations of the stylus assembly 67 and counterweight or mass 90 are 180° out of phase.

According to the illustrated preferred embodiment of the subject invention, the first and second drives or eccenter halves 82 and 83 are mounted on a common shaft 84, and are arranged as closely together as possible or immediately adjacent to each other in order to coincide their lines of action and to minimize the force couple between them which, if substantial, would in itself produce vibration.

The upper or first eccentric drive 83 is coupled to the counterweight or mass 90 via a bearing 97, flange 98 and rod 87. The rod 87 is attached to the counterweight assembly 90, and preferably to the leaf spring 93 thereof. The counterweight or mass part 91, located on the side of the leaf spring 93 facing the eccentric 81, may have an aperture or bore 99 so that the part 91 clears the connecting rod 87 and thereby prevents objectionable forces from interfering with the operation of, and from imposing excessive wear, on the eccentric drive assembly.

The eccentric drives 82 and 83 are coupled to each other by one or more screws or bolts 100 which releasably clamp the drives 82 and 83 to each other. In this respect, it should be noted that the bolt 100 does not extend through the shaft 84. Rather, this bolt extends behind the shaft 84 as seen in FIG. 3, and a similar or corresponding bolt may, if desired, be provided on the side of the shaft 84 facing the observer of FIG. 3. In this respect, reference is made to FIG. 1 which shows a similar set screw 95 extending parallel to, but being spaced from the shaft 84. The bolt 100 has a shaft 101 which extends through a bore 102 in the eccenter drive 83. The shaft 101 of the bolt 100 has a threaded end 103 engaging the thread of an internally threaded bore 104. In this manner, the bolt 100 releasably clamps the first and second eccentric drives or eccenter halves 82 and 83 together.

In principle, either of the first and second eccentric drives 82 and 83 could be connected to the shaft 84, with the other of these eccentric drives being connected to that one eccentric drive and including means for adjusting the position of the other eccentric drive relative to that one eccentric drive. According to the preferred embodiment illustrated in FIG. 3, the second eccentric drive or upper eccenter half 83 is connected to the shaft 84. In particular, the upper half 83 may be attached to the shaft 84 by a press fit or, preferably, by a set screw (not shown).

Further radial set screws 106 and 107 act on the first eccentric drive 82 relative to the shaft 84 for radially adjusting and setting the first eccentric drive 82 relative to the second eccentric drive 83. To this end, the upper and lower eccenter halves 82 and 83 jointly define radial bores 108 and 109 for accommodating the set screws 106 and 107. To permit relative adjustment of the first half 82 relative to the second half 83, the upper half 110 of the bore 108 and the upper half 112 of the bore 109 are smooth, whereas the lower half 113 of the bore 108 and the lower half 114 of the bore 109 are internally threaded for meshing engagement by the screws 106 and 107, respectively.

Among several possible alternatives, the preferred embodiment shown in FIG. 3 elects to design and dimension the upper or second eccentric drive 83 for reciprocation of the counterweight or mass 90 at an amplitude equal to the maximum reciprocation amplitude of the stylus assembly 97. The preferred embodiment of FIG. 3 thus allocates reciprocation amplitude adjustment to the stylus head drive. In FIG. 3, the eccenter 81 is shown as set for minimum amplitude of the reciprocating stylus assembly 67. It may be noted in this respect that the largest clearance between the shaft 84 and the cylindrical wall of the axial bore 115 of the lower eccenter half 82 is at the left side of the shaft 84 as seen in FIG. 3.

The optimum reciprocation amplitude for the stylus assembly 67 may be set by either using a dial gauge or by observing printing in a test mode. In this respect, there should be no detectable gaps or overlaps between the adjacent bands printed by the reciprocating styli 91 in the recording area 110.

For gross adjustment, the clamp bolt or bolts 100 are slackened and axial adjustment is effected with the set screws, the angular position of the eccenter 81 relative to the connecting rods 85 and 87 then being such as to render the set screws 106 and 107 accessible by a screwdriver or suitable wrench. Since progressing tightening of the set screws 106 and 107 tends to jack the upper and lower eccenter halves 82 and 83 apart, it is important that the final adjustment, such as the last 5 to 10 mils, be done with the clamp bolt or bolts 100 in tight position. Final adjustment is thus done by just breaking the tightness of the set screw 106 or 107 which is paying out, tightening the takeup set screw 107 or 106, and then re-tightening the paying out set screw 106 or 107.

Practical tests have confirmed the preferred embodiment of the invention shown in FIG. 3 to present a compact, economical design which satisfies requirements for high precision. In any set position, the eccenter drive 81 is solid, free from backlash, and the amplitude can be adjusted while the angular relationship between the eccentric and the motor shaft 84 is preserved. This is important for the maintenance of a correct phase relationship between the writing encoder and the actual stylus movement.

In this respect, FIG. 2 shows an encoder disc 117 attached to the motor shaft 84 for rotation therewith, and a sensing unit assembly 118 forming part of a writing encoder that reads code markings on the rotating disc 117 to servo-control the motor 80 and stylus reciprocation and to provide timing signals for the stylus driver 53.

In this respect, the subject invention may be implemented in the multistyli printer or recording system as disclosed in the copending patent application entitled Multistyli Recording Systems and filed of even date herewith by H. F. Glavish and the subject inventor; that copending patent application being assigned to the subject assignee and being hereby incorporated by reference herein. In that system, the stylus reciprocation amplitude deliberately overshoots the recording band for each stylus on both sides thereof, and writing by any stylus is limited to an essentially linear velocity region of the reciprocation amplitude. The subject invention has been found to be particularly suited to an implementation of that system, in terms of a reduction of vibration effects and related quality degradations.

The teachings and principles of the subject invention may, of course, be applied to other reciprocating-stylus-type recorders and printers, and various modifications and variations within the spirit and scope of the invention will become apparent or suggest themselves to those skilled in the art.

I claim:

1. In a method of recording information with a stylus assembly in a recording area, the improvement comprising in combination the steps of:
    providing a mass;
    forming an eccentric in two halves and minimizing any force couple between said two halves by arranging said two halves immediately adjacent to each other;
    reciprocating the stylus assembly relative to the recording area with the aid of one of said two halves;
    reciprocating said mass in phase opposition to the reciprocating stylus assembly with the aid of the other of said two halves; and
    dynamically balancing the reciprocating stylus assembly with the reciprocating mass.

2. In a method of recording information with a stylus assembly in a recording area, the improvement comprising in combination the steps of:
    providing a counterweight of a mass corresponding to the mass of the stylus assembly;
    forming an eccentric in two halves and minimizing any force couple between said two halves by arranging said two halves immediately adjacent to each other;
    reciprocating the stylus assembly relative to the recording area with the aid of one of said two halves;
    reciprocating the counterweight in phase opposition to the reciprocating stylus assembly with the aid of the other of said two halves; and
    dynamically balancing the reciprocating stylus assembly with the reciprocating counterweight.

3. In a method of recording information with a stylus assembly, the improvement comprising in combination the steps of:
    providing a mass;
    forming an eccentric in two halves and minimizing any force couple between said halves by arranging said two halves immediately adjacent to each other;
    coupling one of said two halves to the stylus assembly and coupling the other of said two halves to said mass; and
    jointly reciprocating the stylus assembly and said mass in phase opposition to each other by rotating said eccentric.

4. A method as claimed in claim 1 or 3, wherein:
    said mass is reciprocated at an amplitude equal to a maximum reciprocation amplitude of the stylus assembly; and
    said one half is radially adjusted relative to said other half to adjust the reciprocation amplitude of the stylus assembly.

5. A method as claimed in claim 1 or 3, wherein:
    said mass and the stylus assembly each are spring suspended.

6. A method as claimed in claim 5, wherein:
    said mass is reciprocated at an amplitude equal to a maximum reciprocation amplitude of the stylus assembly; and
    said one half is radially adjusted relative to said other half to adjust the reciprocation amplitude of the stylus assembly.

7. In a method of recording information with a stylus assembly, the improvement comprising in combination the steps of:
    forming an eccentric in two halves and minimizing any force couple between said two halves by arranging said two halves immediately adjacent to each other;
    providing a counterweight of a mass corresponding to the mass of the stylus assembly;
    coupling one of said two halves to the stylus assembly and coupling the other of said two halves to the counterweight; and
    jointly reciprocating with said eccentric the stylus assembly and the counterweight in phase opposition to each other.

8. A method as claimed in claim 2 or 7, wherein:
    said counterweight is reciprocated at an amplitude equal to a maximum reciprocation amplitude of the stylus assembly; and
    said one half is radially adjusted relative to said other half to adjust the reciprocation amplitude of the stylus assembly.

9. A method as claimed in claim 2 or 7, wherein:
    said counterweight and the stylus assembly each are spring suspended.

10. A method as claimed in claim 9, wherein:
    said counterweight is reciprocated at an amplitude equal to a maximum reciprocation amplitude of the stylus assembly; and
    said one half is radially adjusted relative to said other half to adjust the reciprocation amplitude of the stylus assembly.

11. A method as claimed in claim 1, 2, 3 or 7, wherein:
    said mass is concentrated relative to the mass of the stylus assembly.

12. In apparatus for recording information with a stylus assembly in a recording area, the improvement comprising in combination:
    first means for reciprocating the stylus assembly relative to the recording area including an eccentric composed of two immediately adjacent halves and means for coupling one of said halves to the stylus assembly; and
    means for dynamically balancing the reciprocating stylus assembly including a counterweight and means coupled to the other of said two halves for reciprocating the counterweight in phase opposition to the reciprocating stylus assembly.

13. In apparatus for recording information with a stylus assembly, the improvement comprising in combination:
    a counterweight;

an eccentric composed of two immediately adjacent halves;

means for jointly reciprocating the stylus assembly and the counterweight in phase opposition to each other, including means for coupling one of said halves to said stylus assembly, means for coupling the other of said halves to said counterweight, and means for rotating said eccentric.

14. Apparatus as claimed in claim 12 or 13, including:
a spring suspension for said stylus assembly; and
a corresponding spring suspension for said counterweight.

15. Apparatus as claimed in claim 12 or 13, wherein:
said counterweight has a mass corresponding to the mass of the stylus assembly.

16. Apparatus as claimed in claim 12 or 13, wherein:
said counterweight reciprocating means include means for reciprocating the counterweight at an amplitude equal to a maximum reciprocation amplitude of the stylus assembly; and
said first means include means for adjusting said one half radially relative to said other half to adjust the reciprocation amplitude of the stylus assembly.

17. Apparatus as claimed in claim 16, wherein:
said counterweight has a mass corresponding to the mass of the stylus assembly.

18. In apparatus for recording information with a stylus assembly in a recording area, the improvement comprising in combination:
an eccentric comprising two immediately adjacent halves one of which is coupled to the stylus assembly for reciprocating the stylus assembly relative to the recording area; and
means for dynamically balancing the reciprocating stylus assembly including a counterweight and means for coupling said two halves to each other at an extreme angular displacement relative to each other, and means for coupling the other of said two halves to the counterweight for reciprocating the counterweight in phase opposition to the reciprocating stylus assembly.

19. Apparatus as claimed in claim 18, wherein:
said two halves are adjustable relative to each other.

20. Apparatus as claimed in claim 18, wherein:
said two halves are radially adjustable relative to each other.

21. Apparatus as claimed in claim 18, wherein:
said eccentric includes means for radially adjusting one of said halves relative to the other of said halves to vary the reciprocation amplitude of the stylus assembly.

22. In apparatus for recording information with a stylus assembly in a recording area, the improvement comprising in combination:
a shaft;
means for rotating said shaft;
an eccentric composed of two immediately adjacent halves located on said shaft, with one of said halves coupled to the stylus assembly for reciprocating the stylus assembly relative to the recording area during rotation of the shaft; and
means for dynamically balancing the reciprocating stylus assembly including a counterweight and means for coupling said two halves to each other at an extreme angular displacement relative to each other, and means for coupling the other of said two halves to the counterweight for reciprocating the counterweight in phase opposition to the reciprocating stylus assembly during rotation of the shaft.

23. Apparatus as claimed in claim 22, wherein:
one of said halves is connected to said shaft; and
the other of said halves is connected to the latter one half and includes means for adjusting the position of the latter other half relative to the latter one half.

24. Apparatus as claimed in claim 22, wherein:
said other of said two halves is connected to said shaft; and
said one of said two halves is connected to said one half and includes means for radially adjusting the one half relative to the other half.

25. Apparatus as claimed in claim 18 or 22, wherein:
said counterweight has a mass corresponding to the mass of the stylus assembly.

26. Apparatus as claimed in claim 18 or 22, including:
a spring suspension for the stylus assembly; and
a spring suspension for the counterweight.

27. Apparatus as claimed in claim 26, wherein:
said counterweight has a mass corresponding to the mass of the stylus assembly.

28. Apparatus as claimed in claim 11, 12, 18 or 22, wherein:
the mass of said counterweight is concentrated relative to the mass of said stylus assembly.

* * * * *